Patented July 9, 1935

2,007,786

UNITED STATES PATENT OFFICE 2,007,786

PROCESS FOR STABILIZATION OF CALCIUM GLUCONATE SOLUTIONS

James A. Austin, Kansas City, Mo., assignor to Jensen-Salsbery Laboratories, Inc., Kansas City, Mo., a corporation of Missouri No Drawing. Application November 20, 1933, Serial No. 698,933

3 Claims. (Cl. 167—68)

This invention relates to improvements in products and process for increasing the availability of calcium as a therapeutic agent in treating diseases or pathological conditions caused or aggravated by a deficiency of this element in the body, as in milk fever, eclampsia, spasms, oseomalacia, skin diseases, and the like, and forms a continuation in part of my application filed July 13, 1932, Serial No. 622,311.

Although there are many salts of calcium, or combinations or mixtures of calcium compounds with other materials, that have been used for oral and intravenous administration, there has been a real demand for a compound of calcium, or a mixture of compounds of calcium with other substances, that might be administered intramuscularly or subcutaneously as well as intravenously.

The only salt of calcium available commercially that fulfills the above requirements is calcium gluconate. This salt is soluble in water at room temperature, only to the extent of about 3%, and it is with considerable difficulty and uncertainty that supersaturated 10% solutions are prepared. Special and costly equipment is necessary to prepare such 10% solutions and particular care must be taken to have the solution absolutely free of any solid particles, as such particles act as nuclei for crystal formation and cause the precipitation of solid calcium gluconate from the solution, until normal solubility is reached.

My experiments have shown that solutions of calcium gluconate, containing less than 10% of the salt, are unsafe for intravenous administration because they are hypotonic and cause hemolysis or laking of the blood. It has also been found that sometimes the 10% solutions of calcium gluconate show crystal formation and they must, therefore, be heated to redissolve the calcium gluconate. This procedure is undesirable to professional men and has caused them to look upon solutions of calcium gluconate with disfavor, although the solutions of this salt possess the desirable properties of being perfectly safe for intramuscular or subcutaneous administration without the usual swelling, sloughing and necrosis which follow intramuscular or subcutaneous injection of the inorganic salts of calcium.

It is possible to prepare solutions of calcium gluconate containing as much as 25% of the salt, but these solutions are highly supersaturated and crystallize upon cooling. It is obvious that such solutions must be kept near the boiling point and are not suitable for therapeutic use.

One of the objects of the invention, therefore, is to produce a process whereby aqueous solutions of calcium gluconate may be readily prepared and which will be entirely stable at room temperature, in much higher concentrations than they may be prepared by customary methods.

I have found that any boron compound, such as the anhydrides, oxides and salts of the acids containing boron, or the acids themselves may be employed.

As examples of such compounds, any of the following or their equivalents may be successfully employed: boric acid; a boron anhydride, such as boron oxide, peroxide or suboxide; the alkali borates and perborates, such as sodium borate, potassium borate, rubidium borate, cæsium borate, and sodium perborate; the alkaline earth borates and perborates, such as calcium borate, magnesium borate, and magnesium perborate.

From my experiments and observation I find that any of these boron compounds, as above particularly limited, have the effect of stabilizing solutions of calcium gluconate when added to hot solutions in proportion to their molecular weights as will hereinafter appear. I believe that a new compound of greater solubility than calcium gluconate is formed and have given it the name calcium borogluconate and the formula $Ca(C_6H_{11}O_7)_2.B_2O_3.H_2O$.

As an example of the process it is to be noted that a 20% solution from boric acid may be made by dissolving about 100 lb. of calcium gluconate in about 400 lb. of boiling distilled water, and after all of the salt has dissolved, and while the solution is hot, about 4 lb. of boric acid is added and the solution is agitated. Evaporation losses are replaced to make the total weight about 500 lb.

From a comparison of the molecular weights and the formula for calcium borogluconate, the proper proportions of the other boron compounds may be readily ascertained, and appear approximately as follows:

10% solution by weight of calcium gluconate

| | Water | Calcium borogluconate formed |
|---|---|---|
| | Percent | Percent |
| 1.00% boric acid | 86 | 4 |
| 0.50% boron oxide | 86 | 4 |
| 3.25% sodium borate | 85.3 | 4 |
| 3.25% calcium borate | 84.5 | 4 |

40% solution by weight of calcium gluconate

|  | Water | Calcium boroglu- conate formed |
|---|---|---|
|  | Percent | Percent |
| 4% boric acid | 44.0 | 16 |
| 2% boron oxide | 44.0 | 16 |
| 13% sodium borate | 41.2 | 16 |
| 13% calcium borate | 38.0 | 16 |

From the above it will be evident that I have produced a process and product involving all of the features of advantage set forth as desirable, and while I have described the preferred embodiments thereof, it is to be understood that I reserve the right to all changes within the spirit of the invention and without the ambit of the prior art.

I claim:—
1. The process of making a new calcium therapeutic agent comprising dissolving from about 10% to 40% calcium gluconate in from about 86% to 38% water, and adding from 1% to 4% boric acid, all by weight.
2. The process of stabilizing calcium gluconate dissolved in hot water in such amount that a portion thereof will crystallize on cooling of the solution, which consists in adding thereto boric acid as a stabilizing agent.
3. The process of stabilizing a calcium gluconate solution made by dissolving calcium gluconate in hot water in such amount that a portion thereof will crystallize on cooling of the solution, which consists in adding to such aqueous solution a boron compound to form a stable concentrated calcium solution.

JAMES A. AUSTIN.